United States Patent
York et al.

(10) Patent No.: US 11,347,288 B2
(45) Date of Patent: May 31, 2022

(54) POWER MANAGEMENT IN A BLADE ENCLOSURE

(71) Applicant: Hewlett Packard Enterprise Development LP, Houston, TX (US)

(72) Inventors: Justin York, Cypress, TX (US); Michael Stearns, Cypress, TX (US); Timothy Majni, The Woodlands, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 60 days.

(21) Appl. No.: 17/069,123

(22) Filed: Oct. 13, 2020

(65) Prior Publication Data

US 2022/0113780 A1  Apr. 14, 2022

(51) Int. Cl.
  *G06F 1/30* (2006.01)
  *H04L 12/10* (2006.01)
  *G06F 1/3234* (2019.01)

(52) U.S. Cl.
  CPC .............. *G06F 1/30* (2013.01); *G06F 1/3234* (2013.01); *H04L 12/10* (2013.01)

(58) Field of Classification Search
  CPC ........... G06F 1/30; G06F 1/3234; H04L 12/10
  See application file for complete search history.

(56) References Cited

U.S. PATENT DOCUMENTS

| | | | |
|---|---|---|---|
| 5,560,001 A * | 9/1996 | Kardach | G06F 1/04 713/500 |
| 6,252,384 B1 | 6/2001 | Arai et al. | |
| 6,308,279 B1 * | 10/2001 | Toll | G06F 1/3203 713/323 |
| 7,454,656 B2 | 11/2008 | Okada et al. | |
| 7,895,455 B2 | 2/2011 | Green et al. | |
| 8,700,923 B2 | 4/2014 | Fung | |
| 2009/0307476 A1 * | 12/2009 | Khatri | G06F 1/26 713/2 |
| 2011/0035611 A1 * | 2/2011 | Brey | G06F 1/3203 713/320 |
| 2019/0044372 A1 * | 2/2019 | Cochran | G06F 1/30 |
| 2021/0068292 A1 * | 3/2021 | Liang | H02J 9/00 |

OTHER PUBLICATIONS

Jiayu Gong and Cheng-Zhong Xu, "VPnP: Automated Coordination of Power and Performance in Virtualized Datacenters," Jun. 2010, pp. 1-9, Wayne State University, Detroit, MI, USA.

* cited by examiner

*Primary Examiner* — Chun Cao
(74) *Attorney, Agent, or Firm* — Hewlett Packard Enterprise Patent Department

(57) ABSTRACT

Examples disclosed herein relate to power management in a blade enclosure. An intrusion detection mode is initiated by a baseboard management controller. Responsive to determining a power shortage in the blade enclosure, a stop clock pin is operated to control power consumption of a server in the blade enclosure. After a predefined time of determining the power shortage, a model specific register (MSR) associated with power settings of a Central processing unit (CPU) of the server is reconfigured. Reconfiguring the MSR comprises, identifying a power profile based on available power in the blade enclosure and modifying register states in the MSR based on the power profile via a baseboard management manager (BMC) of the server. Subsequently, operation of the stop clock pin is stopped.

20 Claims, 3 Drawing Sheets

POWER MANAGEMENT IN A BLADE ENCLOSURE

BACKGROUND

Service providers and manufacturers are challenged to deliver quality and value to consumers, for example by providing access to computing capabilities. A data center is a facility used to house computer networks, computer systems, and associated components, such as telecommunications and storage systems. Datacenters, offices, etc. can be end locations for computing devices manufactured by a manufacturer. Bladed environments are widely used in datacenters and at edge locations to save space and improve system management.

BRIEF DESCRIPTION OF THE DRAWINGS

The following detailed description references the drawings, wherein.

DETAILED DESCRIPTION

Figure 1:
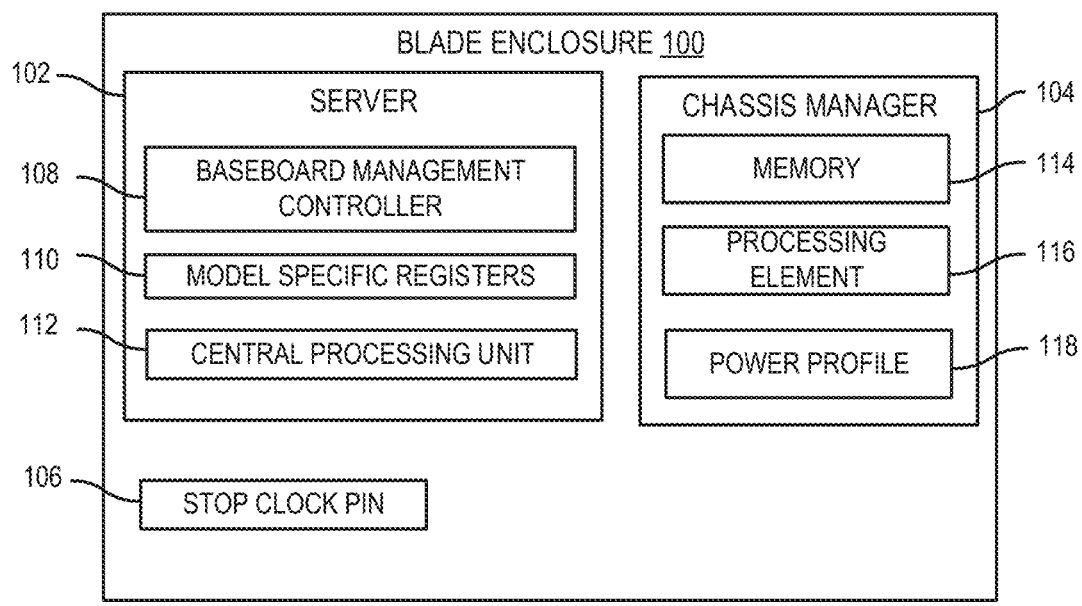
FIGS. 1 and 2 are block diagrams of blade enclosures capable of power management, according to various examples.

A blade enclosure houses multiple server modules (also called blades) in a single chassis. A blade server is a stripped-down server computer with a modular design optimized to minimize the use of physical space and energy. The blade enclosure holds multiple blade servers and provides services such as power, cooling, networking, various interconnects and management to those blade servers. Also, the blade enclosure helps to achieve redundancy and power savings by sharing multiple power supplies amongst the server blades.

Generally, a blade enclosure shares multiple power supplies amongst server blades mounted within the blade enclosure. One or more of the power supplies may fail during a power failure. Thus, the power failure may result in a drop in available power for the blade enclosure resulting in a power shortage. Also, total power available to a blade enclosure may be defined to be capped at a threshold value by a system administrator. The cap may not be appropriate for the context. In an example, based on administrator configuration, a total power made available for the blade enclosure may be 3000 W, however, the components in the blade enclosure may have a power requirement of more than 3000 W. In such a situation, power shortage may occur due to the administrator configuration. To keep the impact of the power shortage to a minimum, the chassis infrastructure and all blade servers should be kept operating, though at a lower power state.

In some examples, a stop clock pin, which is an externally accessible dedicated pin, connects to a stop clock input or a processor overheat input directly on the Central Processing Unit (CPU) of each blade server. The stop clock pin can be driven high or low to toggle the CPU between one of two power consumption modes: "Active" (full power) or "Stop Clock" (reduced power/minimum power). Thus, the stop clock pin can be manipulated to control power consumption of each blade server. In one example, a pulse width modulation signal can be used to control the frequency of the CPU. In this example, the CPU is able to run at a lower core frequency and achieve power savings. The CPU could be held in the active state half of the time and in the stop clock state half of the time of the pulse, resulting in an overall drop in clock speed by about half and consequently saving power.

However, toggling the CPU between the active and stop clock power consumption modes may adversely impact performance of the CPU. Also, with power fluctuations between the active and stop clock modes, corresponding changes in the CPU performance is not linear. For instance, even though the stop clock pin is set in active mode 90% of the time and in stop clock mode for 10% of the time, the performance capability of the CPU may not be 90% of the maximum performance capability due to the high-latency of the stop clock approach. Thus, power management in the blade enclosure may result in sudden and abrupt drops in server performance. Further, the above-explained issue of power management may aggravate with CPUs having a higher range of dynamic power control, such as, where power draw of the CPU may fluctuate between 2-3 Watts to more than 100 Watts.

Approaches described herein enable server blades to operate closer to their maximum capability while staying within a reduced available power when there is a power shortage. In an example, a power supply of a blade enclosure may be subjected to a fault resulting in a power shortage. In an example, when the power shortage is determined, the stop clock pin is operated to manipulate the power consumption of the CPU for a predefined time period after determination of the power shortage. After the predefined period, a chassis controller reconfigures one or more model specific registers (MSR) associated with power settings of the CPU of a blade server based on a predefined power profile via a baseboard management controller (BMC) of the blade server. The CPU is then operated based on the reconfigured MSRs and the stop clock pin is disengaged. Thus, power management is implemented locally by the CPU based on the reconfigured MSRs. This results in reduced power consumption but with improved performance of the CPU.

In this example, power consumption of the CPU is managed locally by the CPU based on the reconfigured MSRs. Thus, changes in the CPU performance may be nearly linear with fluctuations in available power thereby providing better performance. This is because the described techniques enable the CPU to make internal power management decisions based on the reconfigured MSRs instead of operating based on instructions from an external component such as the stop clock pin. Since, the CPU has an operating frequency in the order of Gigahertz, internal power management decisions may be implemented or modified by the CPU locally based on the reconfigured MSRs in a frequency in the order of Gigahertz. In contrast, if the power management decisions of the CPU are driven by the stop clock pin, which operates at maximum frequencies in the order of Kilohertz, the power management decisions are implemented in the CPU in a frequency in the order of Kilohertz. Thus, with the described approaches power management decisions are implemented in the CPU faster, as compared to the stop clock approach. Consequently, latency in implementation of power management decisions in the CPU may be reduced thereby enhancing the performance of the CPU.

Further, the described approaches enable having a fine-grained power configuration applied within the CPU that enables for improved performance for a given wattage limit.

Instead of oscillating the stop clock pin between a maximum and minimum threshold power, the MSRs may be modified to implement a fine-grained power configuration in the CPU which may yield better CPU performance.

Figure 2:
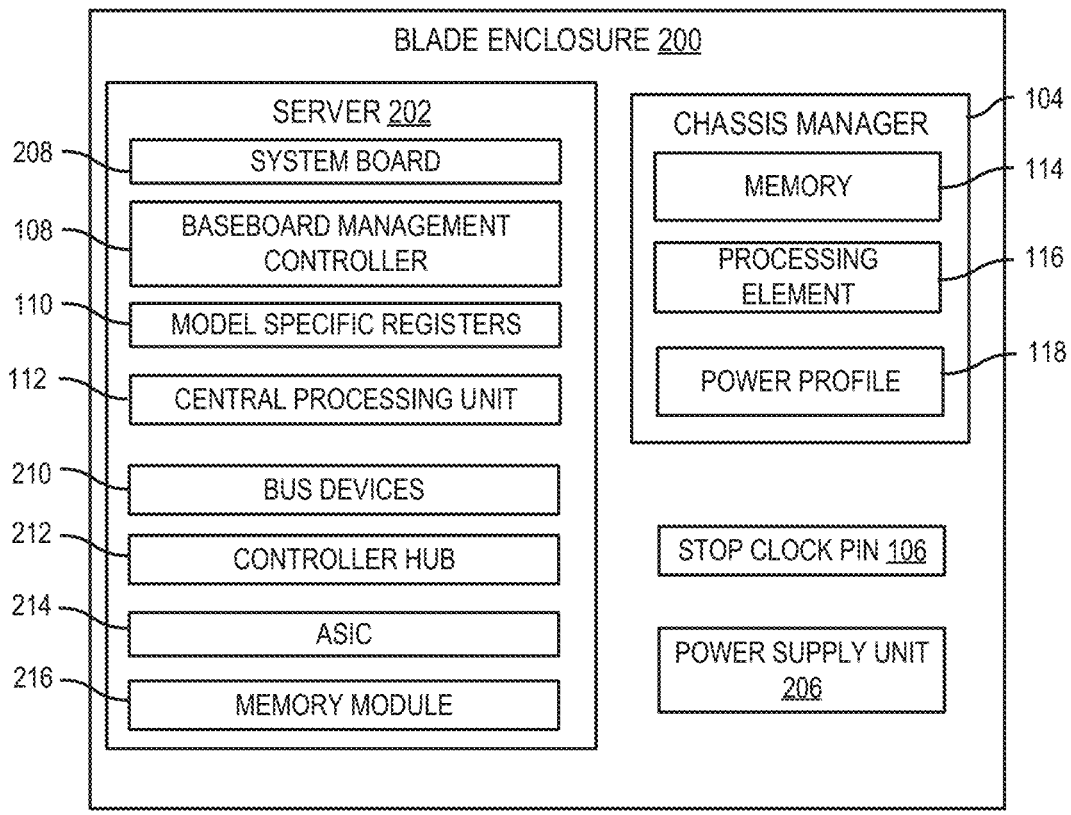

FIGS. 1 and 2 are block diagrams of blade enclosures capable of power management, according to various examples. Blade enclosure 100 includes a server 102, a chassis manager 104, a stop clock pin 106. Blade enclosure 200 also includes a power supply unit 206. The server 102 includes a baseboard management controller (BMC) 108, model specific registers (MSRs) 110, and a central processing unit (CPU) 112. Server 202 also includes a system board 208, one or more bus devices 210, a controller hub 212, one or more application specific integrated circuit (ASIC) 214, and a memory module 216.

In some examples, the BMC 108 can be used to implement services for the server 102, 202. BMC 108 can be implemented using a separate processor from the central processing unit(s) (CPUs) 112 that is used to execute a high level operating system. BMCs can provide so-called "lights-out" functionality for computing devices. The lights out functionality may allow a user, such as a systems administrator, to perform management operations on the server 102, 202 even if an operating system is not installed or not functional on the server 102, 202. Moreover, in one example, the BMC 108 can run on auxiliary power, thus the server 102, 202 need not be powered on to an on state where control of the server 102, 202 is handed over to an operating system after boot. As examples, the BMC 108 may provide so-called "out-of-band" services, such as remote console access, remote reboot and power management functionality, monitoring health of the system, access to system logs, and the like. As used herein, a BMC 108 has management capabilities for sub-systems of a server 102, 202, and is separate from the CPU 112 that executes a main operating system of a computing device (e.g., a server or set of servers).

As noted, in some instances, the BMC 108 may enable lights-out management of the server 102, 202, which provides remote management access (e.g., system console access) regardless of whether the server 102, 202 is powered on, whether a primary network subsystem hardware is functioning, or whether an OS is operating or even installed. The BMC 108 may comprise an interface, such as a network interface, and/or serial interface that an administrator can use to remotely communicate with the BMC 108. As used herein, an "out-of-band" service is a service provided by the BMC 108 via a dedicated management channel (e.g., the network interface or serial interface) and is available whether the server 102, 202, is in powered on state.

In some examples, a BMC 108 may be included as part of the blade enclosure 100, 200. In other examples, a BMC 108 may be included in one or more of the servers (e.g., as part of the management subsystem of the server) or connected via an interface (e.g., a peripheral interface). In some examples, sensors associated with the BMC 108 can measure internal physical variables such as humidity, temperature, power supply voltage, communications parameters, fan speeds, operating system functions, or the like. In other examples, the BMC 108 can collect and store log information, for example, log information associated with power settings of the server 102, 202. The BMC 108 may also be capable to reboot or power cycle the device. As noted, the BMC 108 allows for remote management of the device, as such, notifications can be made to a centralized station using the BMC 108 and passwords or other user entry can be implemented via the BMC 108.

As used herein, an "Operating System" (OS) is a system software that manages computer hardware and software resources and provides common services for computer programs. The OS can be executable on CPU 112 and loaded to memory (not shown). The OS is a high level OS such as LINUX, WINDOWS, UNIX, a bare metal hypervisor, or other similar high level software that a boot firmware engine of the server 102, 202 turns control of the server 102, 202 to.

As used herein, the system board 208 is the main printed circuit board used for the server 102, 202 and allows communication between many of the components of the server 102, 202, for example, the CPU 112, the memory module 216, peripherals, bus devices 210, etc. A number of hardware devices can be coupled to the system board 208. In some examples, a controller hub 212 can be an I/O controller hub, for example a southbridge. The controller hub may be used to manage data communications between a CPU 112 and other components of the system board 208. In some examples, a controller hub 212 may have direct media interface to a northbridge device or the CPU. Further the controller hub 212 may provide peripheral support for the server 202, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc.

Examples of devices or components of the server 202 include bus devices 210 on one or multiple bus (e.g., a PCIe bus), a northbridge device, other ASICs 214, etc. As used herein a memory module 216 is a component that can store information. The memory module 216 can be volatile or non-volatile. Further, the memory module 216 may be addressable by a central processing unit 112 of the server 102, 202. An example of a memory module 216 includes a Dual In-line Memory Module (DIMM).

As used herein, the model specific register(s) (MSRs) 110 refers to a processor register which changes or controls the general behaviour of a CPU 112 or other digital device. Common tasks performed by such processor registers include interrupt control, switching the addressing mode, paging control, and coprocessor control. MSRs may be used in the x86 instruction set for debugging, program execution tracing, computer performance monitoring, and toggling certain CPU features.

In an example, MSR 110 is a processor register which is a quickly accessible location available to the CPU 112. Registers may include a small amount of fast storage. Some registers have specific hardware functions and may be read-only or write-only. In computer architecture, registers are typically addressed by mechanisms other than main memory, but may in some cases be assigned a memory address. Processor registers are normally at the top of the memory hierarchy, and may provide the fastest way to access data. Processor registers generally refer to the group of registers that are directly encoded as part of an instruction, as defined by the instruction set. In some architectures MSRs store data and settings related to the CPU 112 itself. Since the meanings of the MSRs are attached to the design of a specific processor, they may not remain standard between processor generations. Some of the MSRs may be associated with specific functionality of the CPU 112. Based on the values stored in the MSR, the CPU 112 may perform the functionalities associated with the MSR.

The chassis manager 104 may be an embedded system management hardware and software solution to manage multiple servers, networking, and storage within the blade enclosure 100, 200. Chassis manager 104 enables inventory collection, configuration, and monitoring tasks, power management of blade servers, enabling alerts for events on servers, and other components in the blade enclosure 100, 200. Different functionalities of the blade enclosure 100, 200 may be managed and monitored by the chassis manager 104. In an example, the chassis manager 104 may be plugged into a modular blade chassis and powered by the power supply of the blade chassis. Referring to FIG. 2, the power supply unit 206 may supply input power to the chassis manager 104. The power supply unit 206 may include multiple redundant input sources and backups, such that if there if there a failure in one input source, power may be supplied by other input sources/backup supplies. Further, the chassis manager 104 may communicate with the BMC 108 via an ethernet based Out of Band (OOB) communication channel using OOB service provided by the BMC 108. In an example, the OOB communication channel is a dedicated management channel (e.g., the network interface or serial interface).

The chassis manager 104 includes memory 114 and processing element 116. The memory 114 is a component that can store information. The memory 114 can be volatile or non-volatile. Further, the memory 114 may be addressable by a processing element 130 of the chassis manager 104. An example of a memory 114 includes a Dual In-line Memory Module (DIMM), Further, the memory 114 may be coupled to the processing element 116 and the memory 114 may store instructions executable by the processing element 116.

In an example, a power profile 118 may be stored in the memory 114. The power profile 118 may include information that may be used to reconfigure the MSRs 110 associated with power settings of the CPU 112. In an example, the power profile 118 may include values that may be written in the MSRs 110 and corresponding performance parameters for the CPU 112.

As used herein, the stop clock pin 106 refers to a dedicated pin connecting to the CPU 112 on the server 102, 202. In an example, the stop clock pin 106 may transmit control signals to a stop clock input or processor overheat input of the CPU 112 depending on the CPU architecture. In one example, control signals from the stop clock pin 106 can be driven high or low to toggle the CPU 112 between one of two power consumption modes: "Active" (full power) or "Stop Clock" (reduced power).

The power supply unit 206 may include one or more than one input sources for supplying power to the server 102, 202 and other servers and/or components housed within the blade enclosure 100, 200. In an example, the power supply unit 206 may also include one or multiple back-up power supply.

Consider that a power shortage is determined in the blade enclosure 100, 200. In an example, the chassis manager 104 may continuously monitor the available power and power requirement for the blade enclosure 100, 200. Based on a comparison of the available power and the power requirement, the chassis manager 104 may determine that there is a power shortage in the blade enclosure 100, 200. When the available power in a blade enclosure is less than the marked power requirement for the servers and other components housed in the blade enclosure, it may be understood that the blade enclosure has encountered a power shortage. In an example, a power shortage may result due to a power failure arising from a fault in one input source or more than one input sources in the power supply unit 206. In another example, the user may configure the available power of the blade enclosure 100, 200 such that the available power is less than the power required for operation of the servers and other components in the blade enclosure 100, 200, consequently resulting in a power shortage for the blade enclosure 100, 200. Thus, the power shortage may result due to failure/fault in one or more power supplies in the blade enclosure or due to user configuration.

Responsive to determining the power shortage in the blade enclosure 100, 200, the chassis manager 104, operates the stop clock pin 106 to control power consumption of the server 102, 202 in the blade enclosure 100, 200. Although the description herein is elaborated with reference to a single server, in an example, the description is applicable mutatis mutandis for multiple servers housed within a blade enclosure. In an example, operating the stop clock pin 106 includes sending control signals to a stop clock input of the CPU 112 to toggle the CPU 112 between an active (high power) mode and a stop clock (low power) mode. In an example, a pulse width modulation (PWM) signal is sent to the stop clock input of the CPU 112 via the stop clock pin 106 to toggle the CPU 112 between the active and stop clock modes. In an example, in the stop clock mode, the CPU 112 may be operated at, say, 2 to 3 watts and in the active mode the CPU 112 may be operated at, say, 100 to 110 watts. Thus, the stop clock pin 106 is configured oscillate power consumption of the CPU 112 between an upper threshold and a lower threshold. Due to toggling between the two modes, the overall power consumption of the CPU 112 may be reduced.

The chassis manager 104 may identify a power profile based on available power in the blade enclosure 100, 200. In an example, the chassis manager 104 may identify the power profile based on a comparison of the available power and the power requirement of different components in the blade enclosure 100, 200. The power profile 118 may include one or more values to be stored in the MSRs for power management of the blade enclosure 100, 200. Based on the power profile 118, the chassis manager 104 may modify register states in the MSRs 110. In an example, the MSR 110 is indicative of a thermal design power (TDP) of the CPU 112. The TDP is a predefined maximum power at which the CPU is configured to operate under the maximum load. The TDP is a vendor designed threshold of maximum power consumption by the CPU 112 over an extended period of time. CPU performance should be close to its maximum levels when the CPU is consuming the TDP. In an example, modifying register states of the MSR 110 includes adjusting the value stored in the register that indicates the TDP. In an example, the MSR indicative of the TDP may be called a PL1 register.

In another example, the MSR 110 is indicative of a maximum threshold power above TDP at which the CPU 112 is configured to operate in turbo mode. In the turbo mode, the CPU 112 may operate at clock frequencies, higher than the marked clock frequency of the CPU 112. For example, if one core of the CPU 112 would benefit by processing faster while the others are idling or running slower, turbo mode allows the base frequency of that core to be increased on demand in increments of 133 MHz. The MSR may be indicative of the maximum level of power above TDP at which the processor can operate for short periods of time while operating in the turbo mode. In an example, the MSR indicative of the maximum threshold power above TDP may be called a PL2 register.

In an example, the chassis manager 104 may modify register states in the MSR 110 (one of the PL1 or PL2 or both) via the BMC 108 of the server 102, 202. The chassis manager 104 may send the power profile, including specific values to be stored in the MSR 100, to the BMC 108 via an ethernet based Out of Band (OOB) communication channel.

In an example, the chassis manager 104 may send the power profile to the BMC 108 using OOB service provided by the BMC 108 via a dedicated management channel (e.g., the network interface or serial interface). In an example, the chassis manager 104 communicates with the BMC 108 using a Representational State Transfer (REST) Application Programming Interface (API) and sends the power profile.

Figure 3:
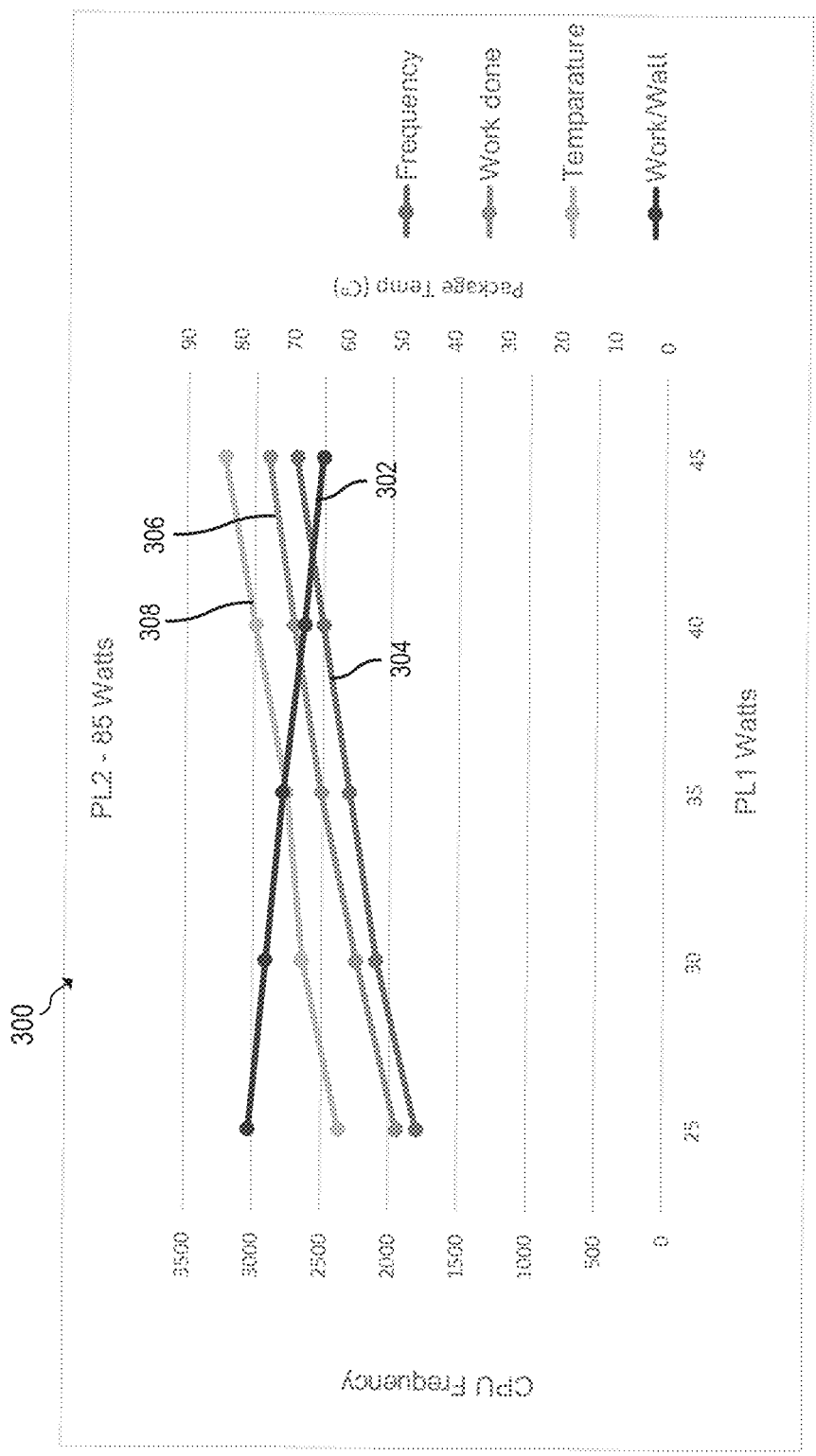
FIG. 3 illustrates the impact of changes in MSR values on performance within a reduced power envelope, according to an example.

In an example, the chassis manager 104 may also send control signals to the BMC 108 to write the specific values in the MSRs 110 as indicated in the power profile. The BMC 108 may communicate with the MSRs 110 and write the specific values in the MSRs 110. In an example, the BMC 108 may communicate with the MSRs 110 through connections in the system board 208. FIG. 3 illustrates a graph 300 showing the impact of changes in the MSR values on performance within a reduced power envelope. Variations in performance of the CPU with variations in an MSR indicative of a TDP of the CPU is exemplified in table 1 below and a graphical representation of the same is illustrated in FIG. 3. With reference to table 1 below, the MSR indicative of the TDP is referred to as "PL1". "PL2" is another MSR indicative of a maximum threshold power above TDP at which the CPU is configured to operate in turbo mode.

The "Freq" refers to the maximum frequency in Mega Hertz (MHz) observed when the CPU is running 100% busy at the designated PL1 and PL2 levels. The "Temp" is the maximum package temperature in degree Centigrade observed with the CPU running 100% busy at the designated PL1 and PL2 settings. "Work Done" represents the work done by the CPU when running a test suite in CPU-only mode which tests the CPU's performance and hardware capabilities. "Work/Watt" is the amount of work done per watt consumed by the CPU. "% of Full Power" is a measure of the current TDP vs. maximum TDP the CPU is running at. "% of Full Perf" is a measure of the overall CPU performance at designated PL1/PL2 levels vs maximum power (TDP). "% of W/W Efficiency" is a percentage increase of work done over maximum TDP at the designated PL1 and PL2 levels. For the purposes of this example, the value of PL2 is kept constant at 85 watts and the values of PL1 is varied over a range of 25 watts to 45 watts. In an example, the PL1 may be reconfigured by the chassis manager 104 as indicated by the power profile 118.

TABLE 1

| PL1 | PL2 | Freq | Temp | Work Done | Work/Watt | % of Full Power | % of Full Perf | % of W/W Efficiency |
|-----|-----|------|------|-----------|-----------|-----------------|----------------|---------------------|
| 25  | 85  | 1800 | 61   | 1946      | 78        | 56%             | 67%            | 21%                 |
| 30  | 85  | 2100 | 68   | 2246      | 75        | 67%             | 77%            | 16%                 |
| 35  | 85  | 2300 | 71   | 2511      | 72        | 78%             | 86%            | 11%                 |
| 40  | 85  | 2500 | 77   | 2714      | 68        | 89%             | 93%            | 5%                  |
| 45  | 85  | 2700 | 83   | 2905      | 65        | 100%            | 100%           | 0%                  |

As can be seen from table 1 and FIG. 3, even at comparatively lower values of PL1, say 25 watts, the work done per unit consumption of power ratio is 78 and the CPU achieves almost 67% of its maximum performance capability. Clearly, even at low power levels, the CPU's performance is improved by modifying the value of the MSRs (PL1 in this case). Also, referring to FIG. 3, the line 302 indicative of work/watt efficiency of the CPU is almost linear over the entire range of variation in PL1 values. This indicates that the CPU performance remains consistent without abrupt fluctuations even with modifications in the values of PL1. The line 304 represents work done by the CPU for running the test suite. The line 304 is almost linear over the entire range of variation in PL1 values thereby indicating that there are very less drops in performance even with modifications in the values of PL1. The line 306 represents the "frequency". Modifications in the MSR (PL1) values also has an impact on the frequency as indicated by the line 306. The line 308 represents the maximum package temperature.

In an example, the power profile 118 based on which the values of the register states of the MSR 110 are reconfigured may include a range of values of PL1. Although in table 1 and FIG. 3, the value of PL1 is varied, in an example, the value of PL2, or a combination thereof may be varied to control the power and performance of the CPU. Of course, other MSRs associated with power settings of the CPU may also be reconfigured to tune the performance of the CPU.

Thus, as explained above the chassis manager 104 reconfigures MSRs 110 associated with power settings of the CPU 112 of the server 102. Once, the MSR 110 is reconfigured the CPU 112 can locally manage its power consumption based on the values stored in the MSR 110. Once the CPU 112 starts to manage its own power consumption based on the reconfigured MSRs, the chassis manager 104 stops operation of the stop clock pin 106. In an example, the chassis manager 104 may send a control signal to the stop clock pin 106 to stop its operation.

Further, responsive to a threshold power being restored to the blade enclosure 100, 200, the chassis manager 104 restores the register states in the MSR to their default values for operating the CPU 112 at a predefined rated power. In an example, the threshold power may be equal to or more than total power requirement of the blade enclosure 100, 200. In an example, the user may change the configuration of the power supply unit 206 to allow more power to be allocated to the blade enclosure 100, 200, consequently restoring the threshold power. In another example, the blade enclosure 100, 200 may recover from a power failure, which may have caused the power shortage thereby restoring the threshold power. In an example, restoring the register states of the MSR 110 includes writing default values in the MSRs. With reference to table 1 and FIG. 3, restoring the register state of the MSR (PL1) includes writing the value "45" in the PL1, where 45 watts is the marked TDP for the CPU.

The server 102, 202 and the chassis manager 104 may include a processing element that may be one or multiple central processing unit (CPU) or a combination of a CPU and other components such as a graphics processing unit (GPU), or microprocessor suitable for retrieval and execution of instructions and/or electronic circuits configured to perform the functionality described herein. In some examples, a firmware engine corresponding to platform firmware such as a BIOS may be implemented as a series of instructions encoded on a machine-readable storage medium of the server 102, 202 and executable by CPU 112.

In some examples, devices such as a server, the enclosure, etc. can use a communication network to communicate. A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANS), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s). Computing devices can connect to other devices using the communication network.

By way of example, devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 4:
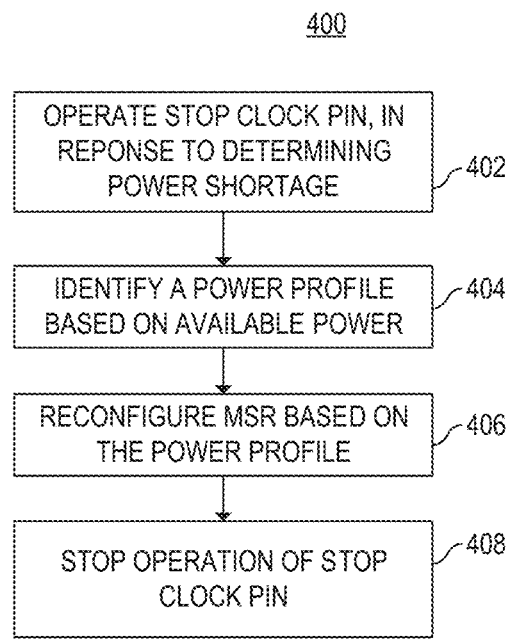
FIG. 4 is a flowchart of a method for power management in a blade enclosure, according to an example.
Figure 5:
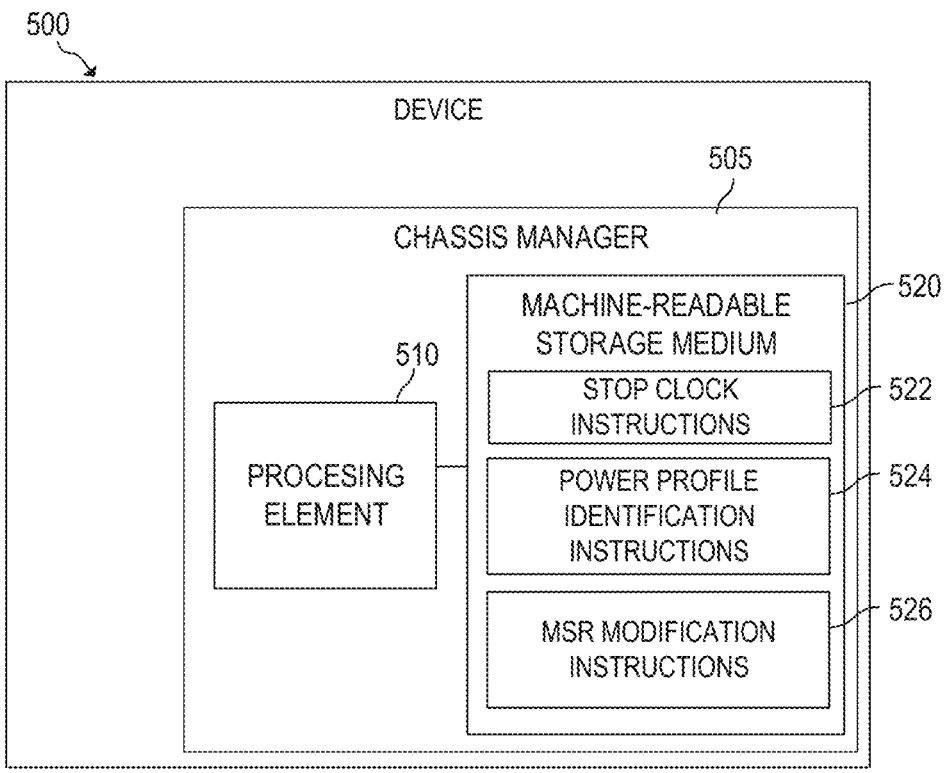
FIG. 5 is a block diagram of a device to perform power management in a blade enclosure, according to an example.

FIG. 4 is a flowchart of a method for power management in a blade enclosure, according to an example. FIG. 5 is a block diagram of a device to perform power management in a blade enclosure, according to an example. Device 500 includes a processing element 510, and a machine-readable storage medium 520 including instructions 522, 524, and 526 for performing power management. Device 500 may be, for example, a blade enclosure, such as blade enclosure 100, 200. The device 500 may include multiple servers (not shown), such as the server 102, 202. The device 500 includes a chassis manager 505 similar to the chassis manager 104. The chassis manager 505 includes a processing element 510 and machine-readable storage medium 520.

Processing element 510 may be, one or multiple central processing unit (CPU), one or multiple semiconductor-based microprocessor, one or multiple graphics processing unit (GPU), other hardware devices suitable for retrieval and execution of instructions stored in machine-readable storage medium 520, or combinations thereof. The processing element 510 can be a physical device. Moreover, in one example, the processing element 510 may include multiple cores on a chip, include multiple cores across multiple chips, or combinations thereof. Processing element 510 may fetch, decode, and execute instructions 522 and 524 to implement power management in a blade enclosure. As an alternative or in addition to retrieving and executing instructions, processing element 510 may include at least one integrated circuit (IC), other control logic, other electronic circuits, or combinations thereof that include a number of electronic components for performing the functionality of instructions 522, 524, and 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for performing power management (e.g., for performing method 400).

Although execution of method 400 is described below with reference to device 500, other suitable components for execution of method 400 can be utilized (e.g., chassis manager 104). Method 400 may be implemented in the form of executable instructions stored on a machine-readable storage medium, such as storage medium 520, and/or in the form of electronic circuitry.

The device 500 may be subjected to a power shortage. Responsive to determining the power shortage in the device 500, at 402, the processing element 510 can execute stop clock instructions 522 to operate a stop clock pin to control power consumption of a server housed in the device 500. The stop clock pin is to oscillate power consumption of a CPU of the server between an upper threshold and a lower threshold.

At 404, power profile identification instructions 424 are executed to identifying a power profile based on available power in the device 500. The power profile may include one or more values to be stored in the MSRs for power management of the device 500. Based on the power profile, the register states in the MSRs may be modified by execution of MSR modification instructions 526, at 406. Modifying the MSRs is also referred to as reconfiguring the MSRs based on the power profile. Thus, in an example, after a predefined time of determining the power shortage, a MSR associated with power settings of the CPU of the server. In an example, the MSR may be indicative of a thermal design power (TDP) of the CPU, the TOP being a predefined maximum power at which the CPU is configured to operate under the maximum load. In another example, the MSR may be indicative of a maximum threshold power above TOP at which the CPU is configured to operate in turbo mode.

In an example, the register states in the MSR is modified based on the power profile via a BMC of the server. The power profile may be sent to the BMC via an ethernet based Out of Band (OOB) communication channel which in turn modifies the register states of the MSR. The chassis manager may communicate with the BMC using a Representational State Transfer (REST) Application Programming Interface (API).

Once the MSRs are reconfigured, the CPU of the server may manage the power consumption of the server based on the reconfigured MSRs. At 408, the stop clock instructions 522 may be executed to stop operation of the stop clock pin. In an example, responsive to a threshold power being restored to the device 500, the register states in the MSR is restored to a default value for operating the CPU at a predefined rated power.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

We claim:

1. A method for power management in a blade enclosure, comprising:

responsive to determining a power shortage in the blade enclosure, operating, by a chassis manager, a stop clock pin to control power consumption of a server in the blade enclosure;

after a predefined time of determining the power shortage, reconfiguring, by the chassis manager, a model specific register (MSR) associated with power settings of a Central Processing Unit (CPU) of the server, wherein reconfiguring the MSR comprises:

identifying a power profile based on available power in the blade enclosure; and modifying register states in the MSR based on the power profile via a baseboard management manager (BMC) of the server; and stopping; by the chassis manager, operation of the stop clock pin.

2. The method of claim 1, wherein the MSR is indicative of a thermal design power (TDP) of the CPU, the TDP being a predefined maximum power at which the CPU is configured to operate under the maximum load.

3. The method of claim 1; wherein the MSR is indicative of a maximum threshold power above TDP at which the CPU is configured to operate in turbo mode.

4. The method of claim 1, wherein reconfiguring the MSR further comprises, sending, by the chassis manager, the power profile to the BMC via an ethernet based Out of Band (OOB) communication channel.

5. The method of claim 1, wherein the stop clock pin is to oscillate power consumption of the CPU between an upper threshold and a lower threshold.

6. The method of claim 1, wherein the chassis manager communicates with the BMC using a Representational State Transfer (REST) Application Programming Interface (API).

7. The method of claim 1, wherein responsive to a threshold power being restored to the blade enclosure, restoring the register states in the MSR for operating the CPU at a predefined rated power.

8. A blade enclosure comprising:
a server; and
a chassis manager comprising:
   a processing element; and
   a memory coupled to the processing element, the memory storing instructions executable by the processing element to:
      operate a stop clock pin to control power consumption of the server, responsive to determining a power shortage in the blade enclosure;
      after a predefined time of determining the power shortage, reconfigure a model specific register (MSR) associated with power settings of a Central Processing Unit (CPU) of the server, wherein reconfiguring the MSR comprises:
         identifying a power profile based on available power in the blade enclosure; and
         modifying register states in the MSR based on the power profile via a baseboard management manager (BMC) of the server; and
      stop operation of the stop clock pin.

9. The blade enclosure of claim 8, wherein the MSR is indicative of a thermal design power (TOP) of the CPU, the TOP being a predefined maximum power at which the CPU is configured to operate under the maximum load.

10. The blade enclosure of claim 8, wherein the MSR is indicative of a maximum threshold power above TOP at which the CPU is configured to operate in turbo mode.

11. The blade enclosure of claim 8, wherein to reconfigure the MSR, the chassis manager is further to, send the power profile to the BMC via an ethernet based Out of Band (OOB) communication channel.

12. The blade enclosure of claim 8, wherein the stop clock pin is to oscillate power consumption of the CPU between an upper threshold and a lower threshold.

13. The blade enclosure of claim 8, wherein the chassis manager communicates with the BMC using a Representational State Transfer (REST) Application Programming Interface (API).

14. The blade enclosure of claim 8, wherein responsive to a threshold power being restored to the blade enclosure; the chassis manager is to restore the register states in the MSR for operating the CPU at a predefined rated power.

15. A non-transitory computer-readable medium comprising computer-readable instructions for power management in a blade enclosure, the computer-readable instructions when executed by a processing element, cause the processing element to:
responsive to determining a power shortage in the blade enclosure, operate; a stop clock pin to control power consumption of a server in the blade enclosure;
after a predefined time of determining the power shortage; reconfigure a model specific register (MSR) associated with power settings of a Central Processing Unit (CPU) of the server, wherein reconfiguring the MSR comprises:
identifying a power profile based on available power in the blade enclosure; and
modifying register states in the MSR based on the power profile via a baseboard management manager (BMC) of the server; and
stop operation of the stop clock pin.

16. The non-transitory computer-readable medium of claim 15, wherein the MSR is indicative of a thermal design power (TDP) of the CPU, the TDP being a predefined maximum power at which the CPU is configured to operate under the maximum load.

17. The non-transitory computer-readable medium of claim 15, wherein the MSR is indicative of a maximum threshold power above TDP at which the CPU is configured to operate in turbo mode.

18. The non-transitory computer-readable medium of claim 15, wherein the computer-readable instructions to reconfigure the MSR, further cause the processing element to send the power profile to the BMC via an ethernet based Out of Band (OOB) communication channel.

19. The non-transitory computer-readable medium of claim 15, wherein the processing element communicates with the BMC using a Representational State Transfer (REST) Application Programming Interface (API).

20. The non-transitory computer-readable medium of claim 15, wherein the computer-readable instructions further cause the processing element to restore the register states in the MSR for operating the CPU at a predefined rated power, responsive to a threshold power being restored to the blade enclosure.

* * * * *